(12) United States Patent
Harada et al.

(10) Patent No.: US 9,257,727 B2
(45) Date of Patent: Feb. 9, 2016

(54) ASSEMBLED BATTERY AND BATTERY PACK

(75) Inventors: Yasuhiro Harada, Yokohama (JP); Norio Takami, Yokohama (JP); Hiroki Inagaki, Kawasaki (JP); Yoshinao Tatebayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1161 days.

(21) Appl. No.: 12/051,986

(22) Filed: Mar. 20, 2008

(65) Prior Publication Data

US 2009/0035658 A1 Feb. 5, 2009

(30) Foreign Application Priority Data

Mar. 20, 2007 (JP) ................................ P2007-073441

(51) Int. Cl.
*H01M 2/20* (2006.01)
*H01M 10/48* (2006.01)
*H01M 10/052* (2010.01)

(52) U.S. Cl.
CPC ............ *H01M 10/482* (2013.01); *H01M 2/206* (2013.01); *H01M 10/052* (2013.01); *Y02T 10/7011* (2013.01)

(58) Field of Classification Search
CPC .............. H01B 1/04; H01B 1/18; H01B 1/24; B23K 20/10; B23K 20/106
USPC .................. 252/519.3–519.34; 524/439, 440; 429/158–161
See application file for complete search history.

(56) References Cited

U.S. PATENT DOCUMENTS

| | | | | |
|---|---|---|---|---|
| 5,180,523 A | * | 1/1993 | Durand et al. | 252/512 |
| 6,139,777 A | * | 10/2000 | Omoya et al. | 252/500 |
| 6,512,654 B2 | * | 1/2003 | Teshima | 360/99.08 |
| 2003/0057402 A1 | * | 3/2003 | Schneck | 252/500 |
| 2003/0170535 A1 | * | 9/2003 | Watanabe et al. | 429/158 |
| 2003/0215702 A1 | * | 11/2003 | Tanjou et al. | 429/127 |
| 2004/0038122 A1 | * | 2/2004 | Hisamitsu et al. | 429/120 |
| 2006/0057457 A1 | * | 3/2006 | Bang | H01M 2/06 429/161 |
| 2006/0127751 A1 | * | 6/2006 | Woo | 429/128 |
| 2006/0134520 A1 | * | 6/2006 | Ishii et al. | 429/223 |
| 2006/0275658 A1 | * | 12/2006 | Sanada et al. | 429/185 |

FOREIGN PATENT DOCUMENTS

| | | |
|---|---|---|
| JP | 01-098674 | 4/1989 |
| JP | 04-142803 | 5/1992 |
| JP | 11-104859 | 4/1999 |

(Continued)

OTHER PUBLICATIONS

JP 2006-004656 A Machine Translation.*

(Continued)

*Primary Examiner* — Barbara Gilliam
*Assistant Examiner* — Robert S Carrico
(74) *Attorney, Agent, or Firm* — Amin, Turocy & Watson, LLP

(57) ABSTRACT

An assembled battery includes a conductive filler, a first cell, a second cell. The first cell includes a flat first electrode tab made of aluminum or an aluminum alloy. The second cell includes a flat second electrode tab made of aluminum or an aluminum alloy. The second electrode tab is electrically connected to the first electrode tab through the conductive filler intervening between the first cell and the second cell and through weld surfaces of the first cell and the second cell which are at least partly welded to each other.

18 Claims, 5 Drawing Sheets

(56) References Cited

FOREIGN PATENT DOCUMENTS

| | | | |
|---|---|---|---|
| JP | 2003-233016 | | 8/2003 |
| JP | 2003-281936 | | 10/2003 |
| JP | 2006-004656 | | 1/2006 |
| JP | 2006-092973 | | 4/2006 |
| JP | 2006100170 A | * | 4/2006 |
| JP | 2006-210312 | | 8/2006 |
| JP | 2007-018881 | | 1/2007 |

OTHER PUBLICATIONS

JP H01-098674 Derwent Abstract.*
IDPL Machine Translation of JP 2006100170 A.*
Translation of JP H01-098674 A.*
Japanese Office Action for Japanese Application No. 2007-073441 issued on Jan. 13, 2012.
Japanese Office Action for Japanese Application No. 2007-073441 mailed on Apr. 24, 2012.

* cited by examiner

ASSEMBLED BATTERY AND BATTERY PACK

CROSS-REFERENCE TO RELATED APPLICATIONS

This application is based on and claims the benefit of priority from the prior Japanese Patent Application No. 2007-073441, filed on Mar. 20, 2007; the entire contents of which are incorporated herein by reference.

TECHNICAL FIELD

The present invention relates to an assembled battery and to a battery pack including the assembled battery.

BACKGROUND

In recent years, the performance of nonaqueous electrolyte secondary batteries has been improved. Consequently, high-output power supplies for a portable electronic appliance, a hybrid car, and an electrical car, and for electric power storage, have been realized. Thus, the development of techniques of reducing the resistance of an assembled battery having a large number of series-connected battery cells is a pressing problem. Generally, high-output secondary batteries capable of supplying a large current generate a large amount of heat at high-speed charging/discharging. Accordingly, the generation of heat can be suppressed by reducing the internal resistances of the assembled batteries. Consequently, the cooling of the batteries is facilitated. Thus, an increase in the lifetime of assembled batteries can be expected by reducing the generation of heat. Also, an increase in the energy density of assembled batteries can be expected by reducing the resistance thereof.

Meanwhile, a flat cell is an example of a battery configured by using an armoring member laminated with a resin layer, a metal layer, and a resin layer. This battery has a simple structure in which flat electrode tabs, for example, formed in strip-like shape are drawn out of the armoring member. Usually, when an assembled battery having flat cells is formed, these electrode tabs are connected to each other. Currently, various methods, such as a bolting method, a resistance welding method, a soldering method, a laser welding method, and an ultrasonic welding method (see, e.g., JP-A-2006-210312), are employed as the techniques of connecting electrode tabs to each other.

In current most common flat cells, a positive electrode tab is formed of aluminum. A negative electrode tab is formed of nickel. Therefore, in the case of manufacturing an assembled battery having these flat cells connected in series, the aluminum tab and the nickel tab are connected to each other.

Meanwhile, a negative electrode active substance of such a flat cell has an electric potential which is equal to or higher than that of a conventional negative electrode active substance. Accordingly, a flat cell using aluminum tabs as both the positive and negative electrode tabs is studied (see, e.g., JP-A-2006-92973).

In the case of manufacturing an assembled battery having series-connected flat cells, which use aluminum tabs as both positive and negative electrode tabs, the aluminum tabs are connected to each other. Generally, the electrode tab formed of aluminum has an advantage that corrosion of the tab due to electrolyte is hard to occur, whereas the electrode tab formed of aluminum has a disadvantage that the formation of an oxide film on a surface of the tab results in increase in the resistance thereof. Accordingly, the oxide film largely affects the connection between the aluminum electrode tabs. The resistance of the connection therebetween is higher than that of the connection between the aluminum tab and the nickel tab. More particularly, in the case of manufacturing a large battery which need to series-connect a large number of battery-cells, the contact resistances respectively corresponding to the connections of adjacent ones of the series-connected battery-cells are added and increase according to the number of the cells. Consequently, the oxide film greatly affects the resistance of the assembled battery.

Meanwhile, a method of connecting aluminum tabs to each other by ultrasonic welding is thought of as a most suitable method for connecting the aluminum tabs to each other. This is for the following reasons. That is, the tabs can be connected by welding, so that the resistance of the assembled battery is less affected by an increase in the resistance, which is caused due to the oxide film, and that battery materials are not heated and are less damaged. However, the ultrasonic welding is performed according to the principle that connection surfaces are connected to each other by being resonated. Therefore, it is difficult to connect surfaces having large areas to each other at a time. When the connection of the surfaces is performed by a commonly-used ultrasonic welder, the electrode tabs are connected to each other in a spot-like manner, that is, the electrode tabs are partly connected to each other. Thus, for example, only parts of the tabs, which are other than the surfaces thereof welded to each other by ultrasonic-welding, are put into contact with each other. That is, the contact between the tabs is insufficient. Additionally, an increase in the contact resistance between the tabs and the resistance of a connection portion between the electrode tabs are likely to be nonuniform. Further, in a case where the body of the battery is shaken for a long time so as to achieve sufficient contact therebetween, a burden is imposed on the connection portion between the electrode tabs. Consequently, a crack or a rupture has become increasingly likely to occur at the connection portion.

Therefore, in the case of the aluminum electrode tabs which are manufactured using a connection method such as the ultrasonic welding method, and which are partly welded to each other, it is difficult to reduce the resistance between the electrode tabs.

SUMMARY

According to an aspect of the invention, there is provided an assembled battery including: a conductive filler; a first cell comprising a flat first electrode tab made of aluminum or an aluminum alloy; a second cell comprising a flat second electrode tab formed of aluminum or an aluminum alloy. The second electrode tab is electrically connected to the first electrode tab through the conductive filler intervening between the first cell and the second cell and through weld surfaces of the first cell and the second cell which are at least partly welded to each other.

According to another aspect of the invention, there is provided a battery pack, including: an assembled battery, including: a conductive filler; a first cell including a flat first electrode tab made of aluminum or an aluminum alloy; and a second cell comprising a flat second electrode tab formed of aluminum or an aluminum alloy, the second electrode tab electrically connected, in series, to the first electrode tab through the conductive filler intervening between the first cell and the second cell and through weld surfaces of the first cell and the second cell which are at least partly welded to each other, a lead having one end that is provided between the flat first electrode tab and the flat second electrode tab, the lead contacted with and electrically connected to the conductive filler; and a circuit electrically connected to the other end of the lead and configured to detect voltages of the first cell and the second cell.

DESCRIPTION OF THE EMBODIMENTS

Figure 1:
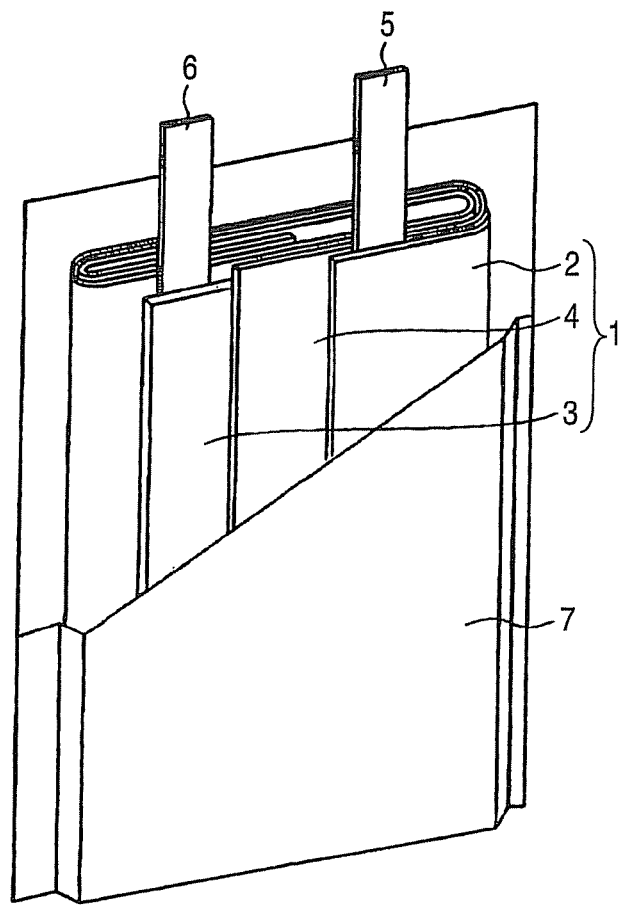
FIG. 1 is an exemplary partially cutaway perspective view illustrating a nonaqueous electrolyte battery according to a first embodiment of the invention.

Hereinafter, each embodiment of the invention is described with reference to the accompanying drawings. Like reference numerals designates like constituent elements common to embodiments of the invention. The redundant description of the common constituent elements is omitted. The accompanying drawings are schematic views for illustrating the invention and for promoting understanding of the invention. Although the shapes, the dimensions and the dimensional ratios of some parts of the embodiments illustrated in the accompanying drawings differ from those of actual devices. However, the design of the actual devices can appropriately be changed by taking the following description and known techniques into account.

(Cell)

First, before an assembled battery according to the present embodiment is described, cells constituting the assembled battery will be described below. Each of the cells includes flat positive and negative electrode tabs, which are made of aluminum or an aluminum alloy and are for example, formed in a strip-like shape. Hereinafter, an example of the structure of the cell is described with reference to FIGS. 1 to 3.

As illustrated in FIG. 1, an electrode group 1 has a structure in which a separator 4 intervenes between a positive electrode 2 and a negative electrode 3, and in which each of the positive electrode 2 and the negative electrode 3 is wound in a flat shape. The electrode group 1 is manufactured by performing hot press on the structure after each of the positive electrode 2 and the negative electrode 3 intervened by the separator 4 is wound in the flat shape. The positive electrode 2, the negative electrode 3, and the separator 4 of the electrode group 1 can be integrated by polymer molecules having adhesiveness. The strip-like electrode tab 5 is electrically connected to the positive electrode 2. On the other hand, the strip-like negative electrode tab 6 is electrically connected to the negative electrode 3. The electrode group 1 is accommodated in a container 7 made of laminated films on each of the three sides of which a heat seal portion is formed. Leading ends of the positive electrode tab 5 and the negative electrode tab 6 are drawn out of the heat seal portion formed at the short side of the container 7.

Figure 2:
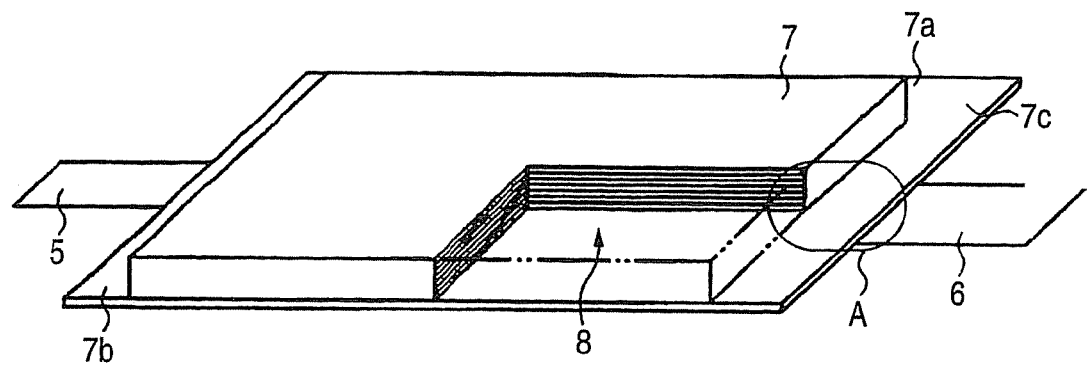
FIG. 2 is an exemplary partially cutaway perspective view illustrating another nonaqueous electrolyte battery according to the first embodiment.
Figure 3:
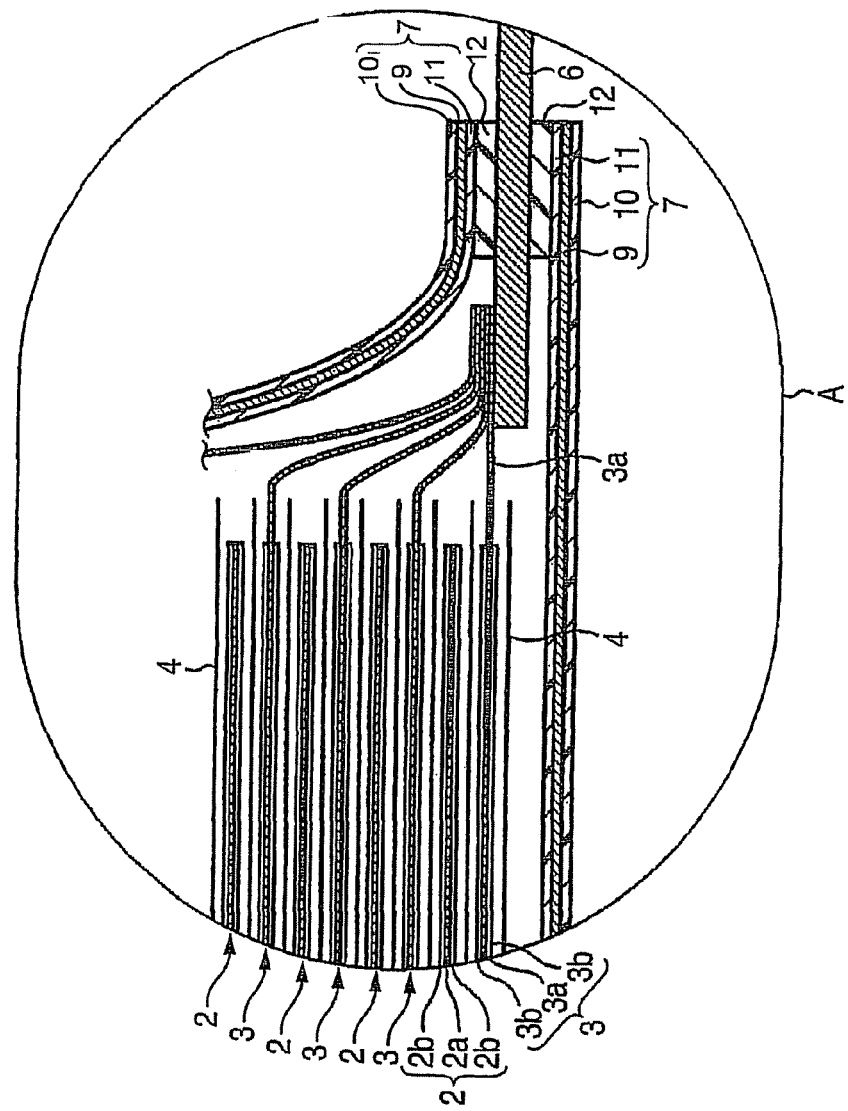
FIG. 3 is an exemplary schematic enlarged cross-sectional view illustrating a primary part of an electrode group of the nonaqueous electrolyte battery shown in FIG. 2.

Although the leading ends of the positive electrode tab 5 and the negative electrode tab 6 are drawn out from the same heat seal portion (i.e., a sealing portion) provided on the container 7 in the case of the electrode group 1 illustrated in FIG. 1, the heat seal portion, from which the positive electrode tab 5 is drawn out, can be set to be different from the heat seal portion, from which the negative electrode tab 6 is drawn out. FIGS. 2 and 3 illustrate more specific examples in the latter case.

As illustrated in FIG. 2, a laminated electrode group 8 is accommodated in the container 7 made of laminated films. As illustrated in, for example, FIG. 3, the laminated films include a resin layer 10, a thermoplastic resin layer 11, and a metal layer 9 interposed between the resin layer 10 and the thermoplastic resin layer 11. The thermoplastic resin layer 11 is disposed on an inner surface of the container 7. Heat seal portions 7a, 7b, and 7c are respectively formed on surfaces corresponding to one long side and both of short sides of the container 7 made of laminated films by heat-sealing of the thermoplastic resin layer 11. The container 7 is sealed by the heat seal portions 7a, 7b, and 7c. As illustrated in FIG. 3, the laminated electrode group 8 has a structure in which the positive and negative electrodes 2 and 3 are alternately stacked with the separator 4 interposed therebetween. There are a plurality of the positive electrodes 2, each of which has a positive electrode collector 2a and positive electrode active substance containing layers 2b supported on both surfaces of the positive electrode collector 2b. There are a plurality of the negative electrodes 3, each of which has a negative electrode collector 3a and negative electrode active substance containing layers 3b supported on both surfaces of the negative electrode collector 3b. One side of the negative electrode collector 3a corresponding to each of the negative electrode 3 protrudes from the associated positive electrode 2. The negative electrode collector 3a protruding from each of the positive electrodes 2 is electrically connected to the strip-like negative electrode tab 6. A leading end of the strip-like negative electrode tab 6 is drawn out to the outside through the heat seal portion 7c of the container 7. Both surfaces of the negative electrode tab 6 face the thermoplastic resin layers 11 constituting the heat seal portion 7c. To enhance the joint strength between the heat seal portion 7c and the negative electrode tab 6, an insulating film 12 intervenes between the thermosetting resin layer 11 and each surface of the negative electrode tab 6. A film made of a material obtained by adding an acid anhydride to polyolefin containing at least one of, for example, polypropylene and polyethylene can be cited as an example of the insulating film 12. Although not shown, the positive electrode collector 2a of the positive electrode 2 has a side that is opposite to a protruding side of the negative electrode collector 3a and that protrudes from the negative electrode 3. The positive electrode collectors 2a protruding from the negative electrode 3 are electrically connected to the strip-like positive electrode tab 5. A leading end of the strip-like positive electrode tab 5 is drawn out to the outside of the battery through the heat seal portion 7b of the container 7. To enhance the joint strength between the heat seal portion 7b and the positive electrode tab 5, an insulating film 12 is interposed between the positive electrode tab 5 and the thermosetting resin layer 11. With the aforementioned configuration, a direction, in which the positive electrode tab 5 is drawn out of the container 7, is opposite to a direction, in which the negative electrode tab 6 is drawn out of the container 7.

Hereinafter, the positive electrode tab 5, the negative electrode tab 6, the negative electrode 1, the nonaqueous electrolyte, the positive electrode 2, the separator 4, and an outer sheath member of the container 7 are described in detail.

Electrode tabs, such as the positive electrode tab 5 and the negative electrode tab 6, are formed of strip-like aluminum members, or strip-like aluminum alloy members. The thickness of each of the electrode tabs may be equal to or less than 1 mm, because the possibility of damaging collection foils, which are provided in the battery, due to impact is low. More specifically, the thickness of each of the electrode tabs may be equal to or less than 500 µm.

In a case where each of the electrode tabs are extended from both ends of the outer-sheath member as illustrated in FIG. 2, the width of each of the tabs may be equal to or more than 20% of the width of the outer-sheath member from which the electrode tabs are drawn out, so that the tensile strength and the hermeticity of the sealing portion are maintained. The width of each of the tabs may be equal to or less than 70% the width of the outer-sheath member from which the electrode tabs are drawn out.

On the other hand, in a case where the electrode tabs are shaped as two parts of the positive and negative electrodes, which are extended out from the same end surface of the outer sheath member, as illustrated in FIG. 1, a tensile force is less likely to be applied the electrode tabs, as compared with the case where the electrode tabs are shaped as two parts of the positive and negative electrodes, which are extended out from both end surfaces of the outer-sheath member. Meanwhile, in a case where the battery is used for supplying a large current, the area of each of the tabs is as large as possible. The total of the widths of the two tabs may be equal to or more than 20% of a width of the outer-sheath member of the battery and be equal to or less than 90% of the width of the outer-sheath member of the battery.

Also, regarding the material of the electrode tabs, the purity of the aluminum plate may be equal to or more than 99%. The material of the aluminum alloy plate may include elements such as magnesium, zinc, and silicon. On the other hand, a contained amount of transition metals, such as iron, copper, nickel, and chrome, may be equal to or less than 1%.

The negative electrode 3 has a negative electrode collector and a negative electrode layer (i.e., a negative electrode active substance containing layer), which is supported on one or both surfaces of the negative electrode collector and contains a negative electrode active substance. The negative electrode layer can include a conductive agent and a binder.

The negative electrode active material may be adapted to occlude lithium in a range of from 0.2 V to 3 V (vs. Li/Li$^+$). Such negative electrode active materials include a metal oxide, a metal sulfide, a metal nitride, or alloys thereof.

The metal oxides may be, for example, a titanium oxide such as $TiO_2$, a lithium titanium oxide (lithium-titanium-containing compound oxide) such as $Li_{4+X}Ti_5O_{12}$ ("X" is a variable meeting the following inequality $(-1 \leq X \leq 3)$) and $Li_{2+X}Ti_3O_7$ ("X" is a variable meeting the following inequality $(-1 \leq X \leq 3)$), a tungsten oxide (e.g., $WO_3$), an amorphous tin oxide (e.g., $SnB_{0.4}P_{0.6}O_{3.1}$), a tin silicon oxide (e.g., $SnSiO_3$), and an oxide silicon (SiO). A lithium titanium oxide and a lithium-titanium-containing metal compound oxide may be adopted among the oxides.

The negative electrode active substance may be such that the mean particle diameter of primary particles thereof is equal to or less than 1 µm, and that the specific surface area based on the $N_2$-adsorption Brunauer-Emmett-Teller (BET) method may be in a range from 3 m$^2$/g to 200 m$^2$/g. Consequently, the affinity between the negative electrode active substance and the nonaqueous electrolyte can be enhanced. Also, the high-speed charge-discharge characteristic of the battery can be enhanced.

A material electrochemically stable at Li occluding/releasing potential of the negative electrode active substance is used as the material of the negative electrode collector. The material of the negative electrode collector may be copper, nickel, stainless-steel or aluminum. The thickness of the negative electrode collector is within a range from 5 µm to 20 µm, because the balance between the strength of the electrode and the reduced weight thereof can be achieved by setting the thickness of the material of the negative electrode collector to be within this range.

The nonaqueous electrolyte is, for example, a liquefied nonaqueous electrolyte prepared by dissolving an electrolyte in an organic solvent, and a gel nonaqueous electrolyte obtained by combining a liquefied electrolyte with a polymer material.

The positive electrode 2 has a positive electrode collector and a positive electrode active substance containing layer, which is supported on one or both of surfaces of the positive electrode collector and includes a positive electrode active substance. The positive electrode layer can include a conductive agent and a binder.

The positive electrode collector may be an aluminum foil or an aluminum-alloy foil.

The thickness of each of the aluminum foil and the aluminum-alloy foil may be equal to or more than 5 µm and is equal to or less than 20 µm. More specifically, the thickness of each of the aluminum foil and the aluminum-alloy foil may be equal to or less than 15 µm. The purity of the aluminum foil may be equal to or more than 99%. The material of the aluminum alloy foil may contain elements, such as magnesium, zinc, and silicon. On the other hand, a contained amount of transition metals, such as iron, copper, nickel, and chrome, is equal to or less than 1%.

The separator 4 can be a porous film containing, for example, polyethylene, polypropylene, cellulose, or polyvinylidene-fluoride (PVdF), or can be a synthetic resin nonwoven cloth. Especially, a porous film containing polyethylene or polypropylene may be from the viewpoint of enhancing safety, because such a porous film can be molten at constant temperature and can interrupt electric current Specifically, the outer-sheath member of the container 7 is a laminated film whose thickness is equal to or less than 0.2 mm.

The laminated film is a multilayer film including a metal layer, and a resin layer covering the metal layer.

In order to reduce weight, the metal layer may be an aluminum foil or an aluminum-alloy foil. The resin layer reinforces the metal layer and can be made of polymers, such as polypropylene (PP), polyethylene (PE), nylon, and polyethylene terephthalate (PET). The laminate film is formed by heat-sealing.

(Assembled Battery)

An assembled battery according to the embodiment is described with reference to FIGS. 4 and 5.

Figure 4:
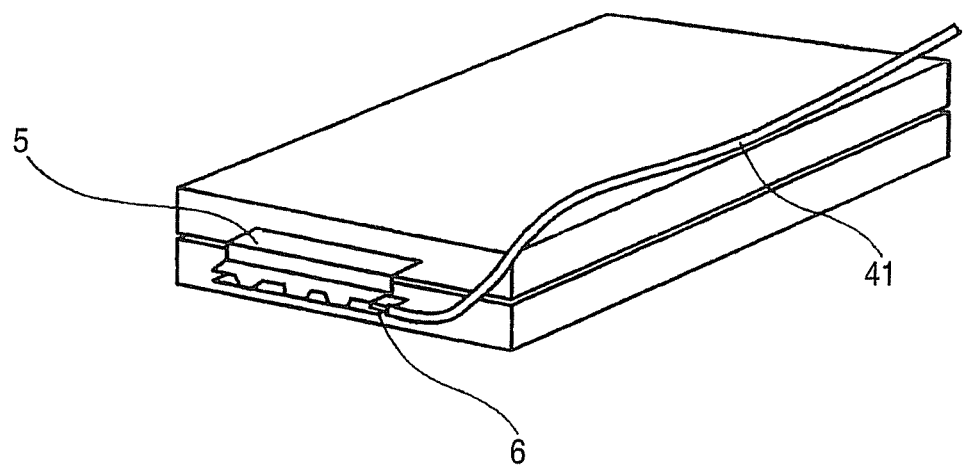
FIG. 4 is an exemplary schematic perspective view illustrating an assembled battery according to the first embodiment.

FIG. 4 is a schematic perspective view illustrating an assembled battery according to the embodiment. In the assembled battery illustrated in FIG. 4, the batteries illustrated in FIG. 2 are stacked and series-connected to each other by connecting the positive electrode tab 5 of the upper-layer battery to the negative electrode tab 6 of the lower-layer battery.

Figure 5:
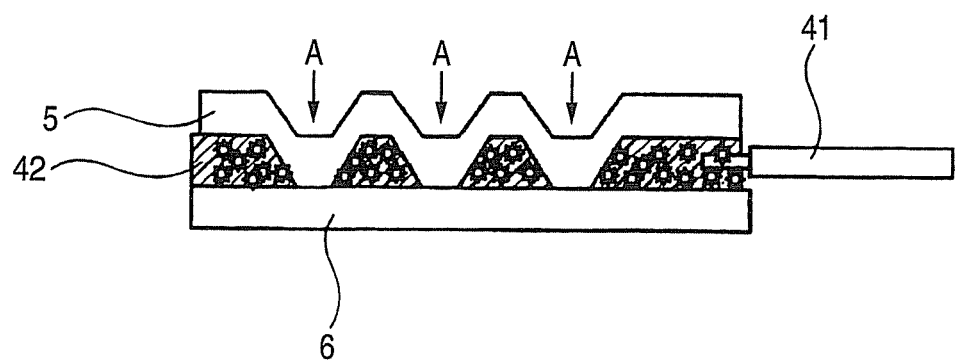
FIG. 5 is an exemplary enlarged cross-sectional view illustrating a joint between electrodes shown in FIG. 4.

FIG. 5 is an enlarged cross-sectional view illustrating the joint portion between the electrodes shown in FIG. 4. As illustrated in FIG. 5, a mixture 42 of the conductive filler and the organic binder is disposed between the positive electrode tab 5 and the negative electrode tab 6. Three weld surfaces A are provided in a spotty manner. The positive electrode tab 5 and the negative electrode tab 6 are welded to each other on the weld surfaces A.

Although the weld surfaces A are distributed in the spotty manner as illustrated in FIG. 5, there is no gap in the joint portion between the aluminum electrode tabs. Thus, ideal surface connection is established. The tabs on which oxidized films are formed like conventional aluminum surfaces are not in contact with each other, but are connected so that the conductive filler are stabbed into these surface films. Thereby, a low resistance can be achieved.

The conductive filler is selected from a group consisting of gold powder, silver powder, nickel powder, aluminum powder, carbon powder, and graphite powder. Metals, which largely differ in ionization tendency from aluminum, may be not adopted from the viewpoint of corrosion in consideration of the connection between such metals and the aluminum electrode tabs. For example, in a case where copper powder is contacted with the aluminum electrode tabs through a resin binder, a local battery reaction is caused by moisture content or the like. Thus, the corrosion of the tabs may proceed.

In view of the cost and the corrosion proof, nickel powder, aluminum powder, carbon powder, and graphite powder are preferable. From the viewpoint of low resistance, nickel powder and aluminum powder are more preferable.

The conductive filler may contain spherical particles and at least one kind of particles, such as flaky particles and dendritic particles, differing in shape from the spherical particles. Consequently, the conductive filler can be in more intimate surface contact with the tabs. Accordingly, closest packing can be achieved. The resistance can efficiently be reduced. Incidentally, in a case where the conductive filler only contains dendritic particles or flaky particles, the filler is oriented when the tabs are connected to each other. Thus, the conductivity may be reduced.

The size of the particles is equal to or larger than 5 μm and is equal to or less than 150 μm. In a case where the size of the particles is equal to or larger than 5 μm, a conductive channel is easily formed when the filler is mixed with the resin binder. Also, in a case where the size of the particles is equal to or less than 150 μm, the gap between the electrode tabs is easily filled with the conductive filler.

A mixture is formed by adding an organic binder such as an epoxy resin, a urethane resin, a silicon resin, an acrylic resin, a polyimide resin, or other thermosetting or thermoplastic resins to the conductive filler. By adding the organic binder to the conductive filler to give adhesiveness, the gap between the electrode tabs can electrically be filled, and fixing between the connected tabs can be made to be more secure.

Among the organic binders, a reactive epoxy resin may be specifically used, since the reactive epoxy resin does not need baking at high temperature. A hardened material obtained by using a liquefied bisphenol F epoxy resin (whose chemical formula: $HO-C_6H_6-CH_2-C_6H_6-OH$) and an amine adduct-type curing agent may be use. A bisphenol A epoxy resin (whose chemical formula: $HO-C_6H_6-C(CH_3)_2-C_6H_6-OH$) may be used, since the bisphenol A epoxy resin is high in versatility. The bisphenol F epoxy resin may be specifically used from the viewpoint of the resistance against vibrations, because a flexible hardened material can be obtained by using the bisphenol F epoxy resin, as compared with the case of using the bisphenol A epoxy resin. In the case of softening other epoxy resins, a plasticizer, such as a flexibility imparting resin denatured by a urethane resin or rubber, may be blended with an epoxy resin in accordance with the relationship between an additive amount of the plasticizer and the conductivity.

The content ratio of the organic binder to a total amount of the conductive filler and the organic binder may be set to be equal to or more than 5% and to be equal to or less than 45%. The content ratio of the organic binder to the total amount of the conductive filler and the organic binder may be specially set to be equal to or more than 10% and to be equal to or less than 25%, for the following reasons. In a case where the content ratio of the organic binder is less than 5%, the bonding strength due to the organic binder can be hardly utilized. In a case where the content ratio of the organic binder is more than 45%, the electric resistance due to the organic binder is extremely high. On the other hand, in a case where the content ratio of the organic binder to the total amount of the conductive filler and the organic binder is set to be equal to or more than 10% and to be equal to or less than 25%, a resistance value does not increase sensitively in response to the content ratio of the organic binder. Thus, the content ratio of the organic binder offers balance between the bonding strength and the conductivity.

Although FIG. 4 illustrates an assembled battery configured by two cells, apparently, the number of cells can optionally be set. For example, in the case of assembled batteries mounted on a hybrid car and an electric car, about 100 to about 200 cells are connected in series. In the case of a battery-assisted bicycle, about 5 to about 20 cells are connected in series. As described above, with increase in the number of series-connected cells, the problem of the internal resistance becomes more serious. Consequently, in the case of the hybrid car and the electric car, on each of which an assembled battery having many series-connected cells is mounted, the assembled battery can provide a high energy density power supply thereto.

One of the manufacturing methods of the battery is to apply the mixture 37 after an oxide layer is removed from the aluminum surface. Thus, the formation of the oxide layer on the aluminum surface can be suppressed. Also, the resistance can be reduced to a low value. However, even in a case where the electrode tabs are connected simply after the conductive filler is applied, the effects of reducing the resistance can similarly be obtained.

Any method of connecting the electrode tabs can be employed as long as the aluminum electrode tabs are partly welded to each other by such a method. However, connecting methods, such as the ultrasonic welding method, which do not utilize mechanical fastening member such as a bolt and a rivet, and heating, are may be adopted. The ultrasonic welding method excels in simple welding, and also excels in reducing the weight of the assembled battery, and in the resistance against vibrations. In the case of performing ultrasonic welding, a trace of a jig providing ultrasonic waves is left on the connecting surface. The trace of the jig usually results in a rugged surface having sharp concavity and convexity.

On the other hand, in the case of performing the bolting method, the resistance of the oxide layer formed on the aluminum surface is high. Also, the contact resistance thereof is high. Therefore, the bolding method is not appropriate. Additionally, when the electrode tabs are connected by a relatively heavy member such as bolts, not only the volume and the weight of the assembled battery increase, but also a contact failure may occur due to vibrations. In the case of performing the resistance welding method and the soldering method, bonding ability is low due to the presence of oxide layers on the aluminum surfaces. When the tabs are connected to each other, the tabs are heated. Thus, the constituent material of the battery may be damaged. Accordingly, it is difficult to employ the resistance welding method and the soldering method. The laser welding method is also appropriate, because the tabs are heated when the tabs are connected to each other.

(Battery Pack)

A battery pack according to the first embodiment is described below with reference to FIGS. 6 and 7.

Figure 6:
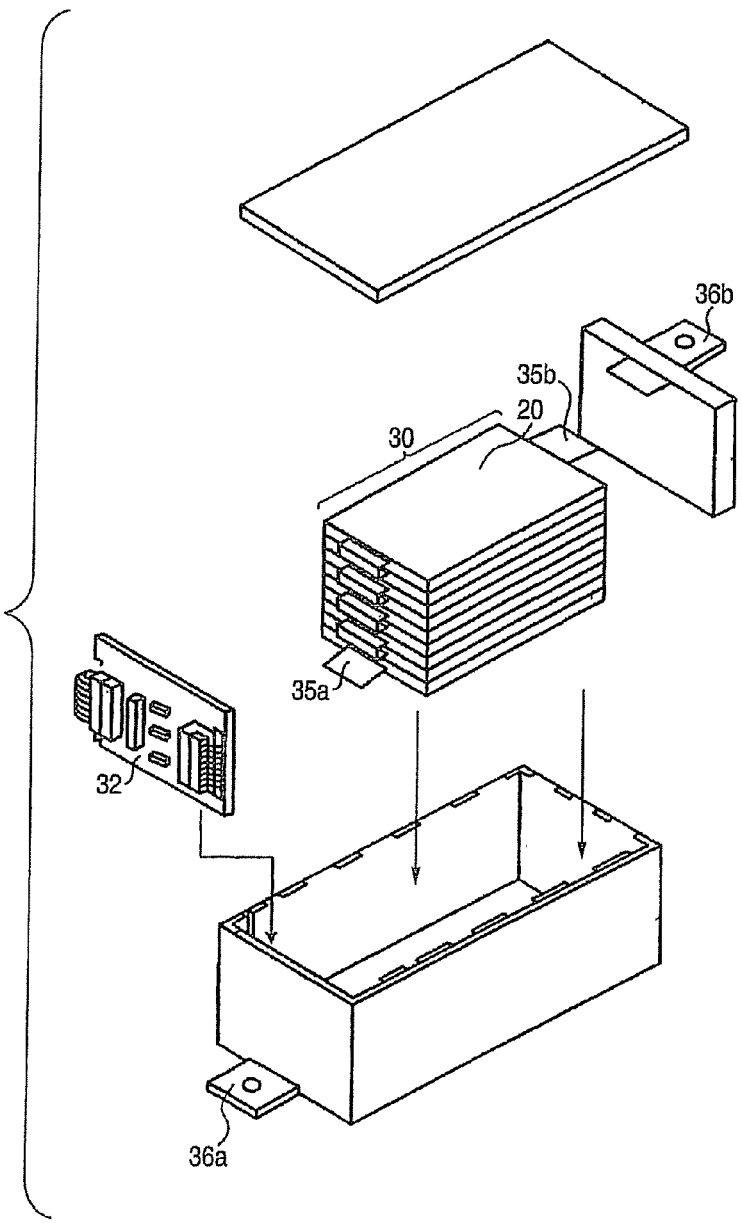
FIG. 6 is an exemplary exploded perspective view illustrating a battery pack according to the first embodiment.

As illustrated in FIG. 6, an assembled battery 30 is configured by stacking cells 10 that include flat laminated lithium ion secondary cells each of which has positive and negative electrode tabs formed of aluminum or an aluminum alloy. The cells 10 are series-connected by alternately connecting the positive and negative electrodes. Differently from the conventional assembled battery, an aluminum-aluminum joint is formed in each connection between the electrode tabs. The conductive filler and the organic binder are interposed between the connection surfaces of the electrode tabs.

The conductive filler and the organic binder are applied onto the positive electrode tab 35a serving as an end portion of the assembled battery 30. The positive electrode tab 35a is connected to an electrode provided on a protection circuit board 32, which is further connected to a copper positive external terminal 36a. The conductive filler and the organic binder are applied also onto the negative electrode tab 35b serving as an end portion of the assembled battery 30. The negative electrode tab 35b is connected to a negative external terminal 36b.

A lead wire 41 (not shown in FIG. 6) for detecting a voltage is bonded to the electrode tab joint portion of each cell. These elements are connected to a voltage detection circuit 33 provided on the protection circuit board 32.

The portion, to which the lead wire for detecting a voltage is bonded, is described below with reference to FIGS. 4 and 5. An exposed metal portion of the lead wire 41 for detecting a voltage is put into and is bonded to a mixture 42 of the conductive filler and the organic binder interposed in the joint portion between the electrode tabs. Hitherto, in the case of the aluminum tabs, it has been difficult to solder a lead wire thereto. However, the conductive filler and the organic binder are interposed in the joint portion between the electrode tabs. Thus, the exposed metal portion of the lead wire 41 can be put into therebetween. Consequently, the lead for detecting a voltage can easily be set. The productivity can be enhanced.

Figure 7:
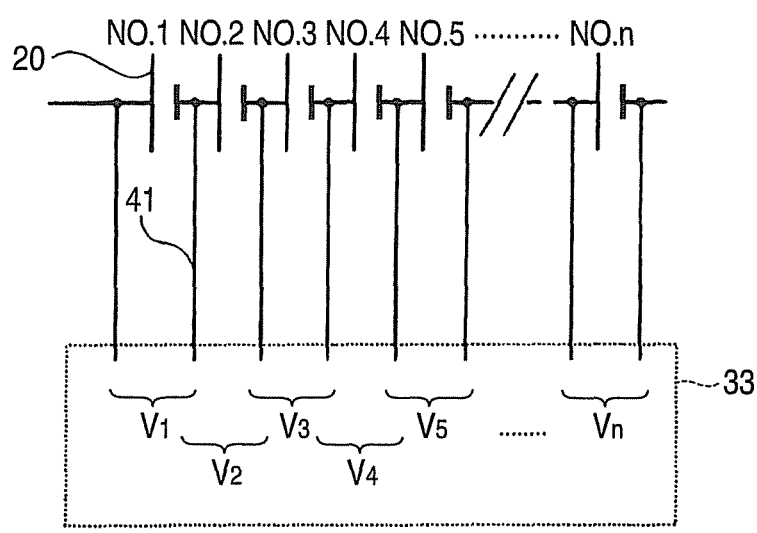
FIG. 7 is an exemplary circuit diagram illustrating circuit connection for detecting a voltage.

FIG. 7 is a diagram illustrating circuit connection for detecting voltages. A lead wire 41 for detecting a voltage, which is drawn out from the connection portion between the electrode tabs of each cell 20, is connected to a voltage detection portion 33. Reference character V1 designates a voltage of the cell in the lowest layer. Similarly, reference character Vn denotes a voltage of the cell in an nth layer. The voltages of the cells can be monitored by measuring the voltages V1 to Vn of the cells. Usually, the voltages of the respective cells of an assembled battery vary to some extent. Accordingly, occurrence of the overcharge and the over-discharge of each cell can be prevented by detecting occurrence of an electrical surge at each cell. Thus, occurrence of heat generation of each cell due to the overcharge and the over-discharge and the deterioration of characteristics thereof can be prevented. Consequently, the deterioration of the entire assembled battery, which is caused by the deterioration of characteristics of each cell, can be prevented.

EXAMPLES

Hereinafter, examples of the first embodiment are described. However, the invention is not limited thereto.

Example 1

Spherical Conductive Filler

Lithium secondary cells, each of which had an aluminum laminated outer-sheath member, were used as a rectangular flat battery. An aluminum material having a purity of 99% was used as the material of each of the positive electrode tab and the negative electrode tab of this cell. The thickness of the material of each of the tabs was set at 200 μm. The width of the material of each of the tabs was set at 25 mm that was 42% of the width of the outer sheath of the battery, which was 60 mm.

Spherical particles made of silver powder, whose mean particle diameter was in a range of from 6 μm to 10 μm, were used as the conductive filler in the tab connection surface. The prepared conductive filler was slurried by being mixed with 2-propanol. The slurry-like filler was applied onto the surfaces of the tabs to be connected to each other. Then, the applied filler was dried for 12 hours at room temperature. Subsequently, the tabs were welded to each other, using an ultrasonic welder. An ultrasonic connection surface was set between a 5 mm-square horn and an anvil. Then, ultrasonic welding was performed at three places arranged at intervals of 5 mm in the width direction of each of the tabs.

Measurement of the alternating-current (AC) impedance was performed on the assembled batteries series-connected in this way (on condition that a frequency in a range of from 0.1 mHz to 100 KHz was used, and that an AC applied voltage was 0.15V). Thus, connection resistances were calculated by removing unnecessary resistance components, such as an internal resistance of a battery body, other than a joint resistance. Then, the connection resistances were compared with one another.

Also, to check the connection's resistance against vibrations, the assembled battery was attached to a vibration exciter. Then, a random sweep of the assembled battery was performed on condition that a vibration frequency was in a range of from 5 Hz to 200 Hz, and the assembled battery was vibrated in three directions, that is, x-direction, y-direction, and z-direction for a total of 6 hours. Similarly, the connection resistance was measured after the vibration. A change in the resistance, which was caused before and after the vibration, was checked.

Example 2

Spherical Conductive Filler+Flaky Conductive Filler

Assembled batteries, to each of which two kinds of conductive fillers differing in shape from each other were applied, were manufactured by using lithium ion secondary cells similar to Example 1.

The spherical conductive filler and the flaky conductive filler were mixed at a rate of 1:1 together with 2-propanol. A resultant mixture was applied onto the surfaces of the tabs to be connected. Then, the surfaces were dried for 12 hours at room temperature. Subsequently, the electrode tabs were welded to each other, using an ultrasonic welder, similarly to Example 1.

Then, the connection resistance and the resistance against vibrations of the manufactured assembled batteries were checked, by performing a method similar to Example 1.

Example 3

Spherical Conductive Filler+Flaky Conductive Filler+Organic Binder

Assembled batteries, to each of which two kinds of conductive fillers differing in shape from each other were applied, were manufactured by using lithium ion secondary cells similar to Example 1, and also using a mixture of conductive filler and an organic binder. The spherical conductive filler and the flaky conductive filler were mixed at a rate of 1:1. Then, this mixture was kneaded with a liquefied bisphenol F epoxy resin whose amount is 20% of a total amount of a resultant mixture. An amine adduct-type curing agent was used for curing the resin. Then, the surfaces were dried for 12 hours at room temperature.

Then, the connection resistance and the resistance against vibrations of the manufactured assembled batteries were checked, by performing a method similar to Example 1.

Comparative Example 1

Assembled batteries were prepared by using lithium ion secondary cells similar to those according to Example 1 and directly connecting unprocessed aluminum tabs with each other. In a state where the surfaces of the tabs were unprocessed, the tabs were welded to each other, using an ultrasonic welder. An ultrasonic connection surface was set between a 5 mm-square horn and an anvil. Then, ultrasonic welding was performed at three places arranged at intervals of 5 mm in the width direction of each of the tabs.

Then, the connection resistance and the resistance against vibrations of the manufactured assembled batteries were checked, by performing a method similar to Example 1.

TABLE 1

|  | Connection-Resistance Ratio | Resistance Increment After Vibration Test |
| --- | --- | --- |
| Example 1 | 0.81 | 32% Increase |
| Example 2 | 0.72 | 45% Increase |
| Example 3 | 0.75 | Substantial No Change |
| Comparative Example 1 | 1 | 10% Increase |

Table 1 shows the connection resistance ratio of each of the connection resistances measured according to Examples 1, 2 and 3 to the connection resistance measured according to Comparative Example. Table 1 also shows an increase of the resistance obtained after a vibration test from the resistance obtained before the vibration test. Assuming that the connection resistance of the comparative example is 1, the resistance values of Examples 1 to 3 are less than 1. Thus, it is clearly understood that the connection resistance is reduced in Examples 1 to 3.

More specifically, Example 2 obtained by mixing spherical and flaky conductive fillers differing shape from each other exhibits the lowest connection resistance. Example 3 containing the organic binder exhibits the second lowest connection resistance, Example 1 containing only the spherical conductive filler exhibits the third lowest connection resistance, and Comparative Example exhibits the highest connection resistance.

Additionally, it is found from the increase of the connection resistance, which is caused before and after the vibration test, that Example 3 containing the organic binder is least affected by vibrations. The reason is considered that even after the vibrations, the conductive filler is less detached because of the elasticity of the organic binder. It is found that in order to obtain an assembled battery having a low resistance and being superior in resistance against vibrations, the conductive filler is combined with the organic binder. Additionally, in the case of Comparative Example, it is confirmed that the resistance increases due to vibrations and that small cracks are generated in the joint portion.

According to the present embodiment, in a method of joining lithium ion secondary cell-batteries of an assembled battery, which have a plurality of laminated outer sheath films and are connected in series, the contact resistance can be reduced by joining the secondary batteries through the conductive filler. Consequently, an assembled battery having a high energy density can be provided by reducing the internal resistance of the assembled battery.

According to the above-mentioned embodiment, an assembled battery is configured so that the resistance between electrode tabs is low, and can also provide a battery pack having such an assembled battery.

Although the embodiments of the invention have been described above, the invention is not limited thereto and can be variously altered within the scope of the invention. The invention can variously be modified on implementation without departing from the spirit thereof. Various embodiments of the invention can be implemented by appropriately combining a plurality of the constituent elements disclosed in the description of the embodiments.

The invention claimed is:

1. An assembled battery, comprising:
a first cell comprising a first electrode tab made of aluminum or an aluminum alloy and comprising a plurality of protruding welding surfaces distributed as spots;
a second cell comprising a second electrode tab formed of aluminum or an aluminum alloy,
wherein the first electrode tab is partially welded to the second electrode tab at the plurality of protruding welding surfaces and the first electrode tab and the second electrode tab are electrically connected at the plurality of protruding welding surfaces;
a plurality of gaps formed between the first electrode tab and the second electrode tab between the plurality of protruding welding surfaces; and
a mixture formed within the plurality of gaps comprising a conductive filler and an organic binder,
wherein the second electrode tab is further electrically connected to the first electrode tab via the conductive filler,
wherein the mixture is stabbed into a first oxide film formed on a surface of the first electrode tab and a second oxide film formed on a surface of the second electrode tab, and
wherein the conductive filler is selected from carbon powder and graphite powder.

2. The assembled battery according to claim 1, wherein the conductive filler comprises spherical particles and at least one of a plurality of flaky particles and a plurality of dendritic particles.

3. The assembled battery according to claim 1, wherein the organic binder is a material obtained by hardening a bisphenol F epoxy resin.

4. The assembly battery according to claim 1, wherein the plurality of gaps respectively have a width of about 5.0 mm.

5. The assembled battery according to claim 1, further comprising an outer-sheath member which is a laminated film.

6. The assembled battery according to claim 1, wherein each of the first and second electrode tabs is equal to or less than 1 mm in thickness.

7. The assembled battery according to claim 1, wherein the conductive filler is the carbon powder.

8. The assembled battery according to claim 1, wherein the conductive filler is the graphite powder.

9. The assembled battery according to claim 1, wherein the first electrode tab is partially welded to the second electrode tab at the plurality of protruding welding surfaces by ultrasonic welding.

10. A battery pack, comprising:
an assembled battery, comprising:
a first cell comprising a first electrode tab made of aluminum or an aluminum alloy and comprising a plurality of protruding welding surfaces distributed as spots;
a second cell comprising a flat second electrode tab formed of aluminum or an aluminum alloy,
wherein the first electrode tab is partially welded to the second electrode tab at the plurality of protruding welding surfaces and the first electrode tab and the second electrode tab are electrically connected, in series, at the plurality of protruding welding surfaces;
a plurality of gaps formed between the first electrode tab and the second electrode tab between the plurality of protruding welding surfaces;
a mixture formed within the plurality of gaps comprising a conductive filler and an organic binder,
wherein the second electrode tab is further electrically connected to the first electrode tab via the conductive filler;
a lead having one end that is provided between the first electrode tab and the second electrode tab, the lead contacted with and electrically connected to the conductive filler; and
a circuit electrically connected to the other end of the lead and configured to detect voltages of the first cell and the second cell.

11. The battery pack according to claim 10, wherein the conductive filler comprises spherical particles and at least one of a plurality of flaky particles and a plurality of dendritic particles.

12. The battery pack according to claim 10, wherein the conductive filler is selected from carbon powder and graphite powder.

13. The battery pack according to claim 12, wherein the organic binder is a material obtained by hardening a bisphenol F epoxy resin.

14. The battery pack according to claim 10, wherein
the plurality of gaps respectively have a width of about 5.0 mm.

15. The battery pack according to claim 10, wherein the assembled battery further comprises an outer-sheath member which is a laminated film.

16. The battery pack according to claim 10, wherein the conductive filler is the carbon powder.

17. The battery pack according to claim 10, wherein the conductive filler is the graphite powder.

18. The battery pack according to claim 10, wherein the first first electrode tab is partially welded to the second electrode tab at the plurality of protruding welding surfaces by ultrasonic welding.

* * * * *